Feb. 23, 1965 G. M. DILLARD ETAL 3,171,082
RANDOM PERMUTATION GENERATOR EMPLOYING PULSE WIDTH GENERATOR AND CIRCULATING SHIFT REGISTER
Filed Feb. 4, 1963
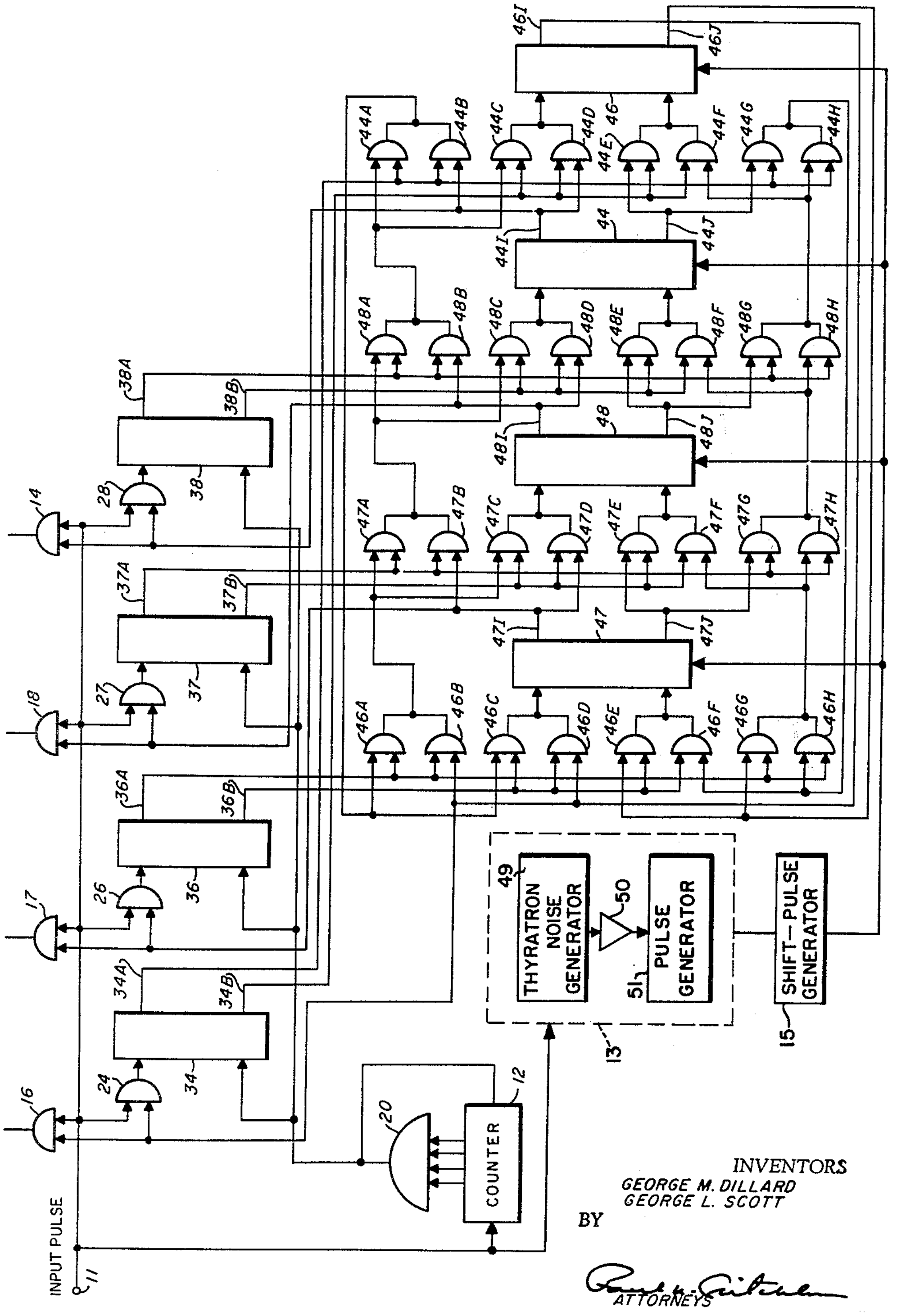
INVENTORS
GEORGE M. DILLARD
GEORGE L. SCOTT
BY
ATTORNEYS 3,171,082
Patented Feb. 23, 1965

3,171,082

RANDOM PERMUTATION GENERATOR EMPLOYING PULSE WIDTH GENERATOR AND CIRCULATING SHIFT REGISTER

George M. Dillard, 7130 Forum, San Diego, Calif., and George L. Scott, % California Institute of Technology, Pasadena, Calif.

Filed Feb. 4, 1963, Ser. No. 256,174
6 Claims. (Cl. 328—60)
(Granted under Title 35, U.S. Code (1952), sec. 266)

The invention described herein may be manufactured and used by or for the Government of the United States of America for governmental purposes without the payment of any royalties thereon or therefor.

The present invention relates to a random permutation generator and more particularly to a random permutation generator in which no number is repeated in a given set until all of the numbers in the set have been selected.

The prior art random permutation generators have in the main had for their prime mission a random generator with the quality of complete fortuity i.e. no one number in the set was more likely to come up than any other number. A generator of this type is disclosed in U.S. Patent No. 2,767,315 by L. Costen which issued October 16, 1956. The Costen circuit yields a random digit where one digit has no more chance of coming up than any other digit in the set. By definition, however, complete fortuity also includes the possibility of the repetition of one or more numbers and this quality is desirable for the purposes for which the Costen generator was designed.

There has been a long felt need, however, for a random digit generator or random permutation generator in which there exists an exception to the complete fortuity desired in the Costen digit generator. This exception is in the non-repetition of a number of a given set until all of the numbers of the set have been chosen. Thus, in certain instances a complete scan of a given set is required with no repetition before the next set is started to insure that each position or number is utilized the same number of times. One such use would be in the random scanning of a radar antenna. Here it is desirable that the entire area be scanned periodically, but in some instances it is also desirable that given sectors of the area are scanned in random order.

According to the invention, a random width pulse generator is triggered by a clock pulse. The random width pulse generator is then utilized to gate a shift pulse generator, the output of which shifts a circulating storage means such as a shift register with a given number of stages, the number of stages equal to the number of conditions in the permutation. One of the stages of the shift register is set at condition 1 and the others at condition 0. Thus, the condition 1 is shifted around the shift register with the output of the shift pulse generator. When the shift pulse generator stops after its gate is closed by the random pulse width generator, the stage with the 1 stored is a completely randomly selected stage, which corresponds to 1 condition. At this point a readout pulse reads out all of the stages of the shift pulse generator and that condition is sensed. Each stage of the shift register has a bistable multivibrator associated therewith. At the time of readout the bistable multivibrator associated with that stage having a 1 stored therein is triggered to its opposite state shorting that stage out to avoid ambiguity in the next readout. A counter counts the number of readouts, and when the number of readouts equals the number of stages in the shift pulse register, all of the multivibrators are reset to their original condition and the cycle repeats itself.

It is thus an object of the present invention to provide a random permutation generator having a predetermined number of possible conditions to be sensed.

Another object of the present invention is to provide a random permutation generator in which all of the possibilities of a given set are sensed before any one possibility can be repeated.

A further object of the invention is a provision of the random permutation generator which requires a minimum of adjustment.

Yet another object of the present invention is to provide a random permutation generator which is simple, automatic in operation and relatively inexpensive.

A still further object of the present invention is to provide a random permutation generator in which the number of possible conditions can be varied with a minimum of modification.

These and other objects of the present invention will become more readily apparent with refernce to the following detailed description taken in conjunction with the drawings in which the sole figure is a block diagram of a preferred embodiment of the present invention.

Referring to the drawing there is shown input terminal 11 connected to counter 12 and random width pulse generator 13. The pulse generator 13 comprises a thyratron noise generator 49 which is coupled through an amplifier 50 to a pulse generator 51. The thyratron noise generator 49 produces a random noise-electrical output which is amplified and used to modulate the waveform of the pulse generator 51. The random-width pulse generator 13 is disclosed in co-pending application Serial No. 170,287, filed January 31, 1962, Random Number Generator. Input terminal 11 is also connected to coincidence gates 14, 16, 17, 18, 24, 26, 27, and 28. Coincidence gates 24, 26, 27 and 28 are connected to bistable multivibrators 34, 36, 37 and 38 respectively. The output of random width pulse generator 13 is connected to shift pulse generator 15, the output of which is connected to shift register stages 44, 46, 47 and 48. Counter 12 has its outputs connected to coincidence gate 20, the output of which is connected to one input of bistable multivibrators 34, 36, 37 and 38. Output 47*i* of shift register stage 47 is connected to one input of coincidence gates 17, 47*b* and 47*c* and 47*d*. Output 47*j* of shift register stage 47 is connected to one input of coincidence gate 47*f* and 47*g*. Output 47*i* of shift register stage 48 is connected to one input of coincidence gates, 18, 48*b* and 48*d*. Output 48*j* of shift register stage 48 is connected to one input of coincidence gates 48*e* and 48*g*. The output 44*i* of shift register stage 44 is connected to one input of coincidence gates 14, 44*b* and 44*d*. The output 44*j* of shift register stage 44 is connected to one input of coincidence gates 44*e* and 44*g*. The output 46*i* of shift register stage 46 is connected to one input of coincidence gates 16, 46*b* and 46*d*. The output 46*j* of shift register stage 46 is connected to one input of coincidence gates 46*e* and 46*g*.

Output 37*a* of multivibrator 37 is connected to one input of coincidence gates 47*a* and 47*h* and to a second input of coincidence gates 47*d* and 47*g*. Output 37*b* of multivibrator 37 is connected to one input of coincidence gates 47*c* and 47*f* and a second input of coincidence gates 47*d* and 47*e*. Output 38*a* of multivibrator 38 is connected to one input of coincidence gates 48*a* and 48*h* and a second input of coincidence gates 48*b* and 48*g*. Output 38*d* of multivibrator 38 is connected to one input of coincidence gates 48*c* and 48*f* and a second input of coincidence gates 48*d* and 48*e*. Output 34*a* of multivibrator 34 is connected to one input of coincidence gates 44*a* and 44*h* and a second input of coincidence gates 44*b* and 44*g*. Output 34*b* of multivibrator 34 is connected to one input of coincidence gates 44*c* and 44*f* and a second input of coincidence gates 44*d* and 44*e*. Output 36*a* of multivibrator 36 is connected to one input of coincidence gates 46*a* and 46*h* and a second input of coincidence gates 46*b* and 46*g*. Output 36*b* of multivibrator 36 is connected to one input of coincidence gates 46*c* and 46*f* and a second input of coincidence gates 46*d* and 46*e*.

The outputs of coincidence gates 46*a* and 46*b* are connected together and to a second input of coincidence gates 47*a* and 47*c*. The outputs of gates 46*c* and 46*d* are connected together and form one input of shift register stage 47. The outputs of coincidence gates 46*e* and 46*f* are connected together and form a second input of shift register stage 47. The output of coincidence gates 46*g* and 46*h* are connected together and form a second input of coincidence gates 47*f* and 47*h*.

The outputs of coincidence gates 47*a* and 47*b* are connected together and form a second input of coincidence gates 48*a* and 48*c*. The outputs of coincidence gates 47*c* and 47*d* are connected together and form one input of shift register stage 48. The outputs of coincidence gates 47*e* and 47*f* are connected together and form a second input of shift register stage 48. The outputs of coincidence gates 47*g* and 47*h* are connected together and form a second input of coincidence gates 48*f* and 48*g*.

The outputs of coincidence gates 48*a* and 48*b* are connected together and form a second input of coincidence gates 44*a* and 44*c*. The outputs of coincidence gates 48*c* and 48*d* are connected together and form one input of shift register stage 44. The outputs of coincidence gates 48*e* and 48*f* are connected together and form a second input to shift register stage 44. The outputs of coincidence gates 48*g* and 48*h* are connected together to form a second input of coincidence gates 44*f* and 44*h*.

The outputs of coincidence gates 44*a* and 44*b* are connected together and form a second input of coincidence gates 46*a* and 46*c*. The outputs of coincidence gates 44*c* and 44*d* are connected together and form one input of shift register stage 46. The outputs of coincidence gates 44*e* and 44*f* are connected together and form a second input to shift register stage 46. The outputs of coincidence gates 44*g* and 44*h* are connected together and form a second input to coincidence gates 46*f* and 46*h*.

The outputs of coincidence gates 46*a* and 46*b* are connected together and form a second input of coincidence gates 47*a* and 47*c*. The outputs of coincidence gates 46*c* and 46*d* are connected together to one input of shift register stage 47. The outputs of coincidence gates 46*e* and 46*f* are connected together to a second input of shift register stage 47. The outputs of coincidence gates 46*g* and 46h are connected together and to a second input of coincidence gates 47*f* and 47*h*.

*Operation*

In operation an evenly spaced clock pulse is introduced to input terminal 11 which provides an input to counter 12 and random-width pulse generating means 13. The clock pulse at input terminal 11 also provides enabling signals to coincidence gates 16, 17, 18, 14, 24, 26, 27, and 28. Upon receipt of a clock pulse, random-width pulse generator 13 produces a pulse at its output which is utilized to gate shift pulse generator 15. Shift pulse generator 15 then puts out a series of evenly spaced pulses, the number of which depending upon the width of the gate received from the random-width pulse generator 13. Stages 44, 46, 47 and 48 form a circulating shift register which is shifted one stage with each pulse received from shift pulse generator 15. One of the stages of the circulating shift register is set at one and the rest are set at zero. Thus, the one will circulate through the stages until the random-width pulse generator 13 gates shift pulse generator is off, at which time the entire system will wait for the next clock pulse at terminal 11. Bistable multivibrators 34, 36, 37 and 38 each have outputs controlling the coincidence gates at the outputs of the circulating shift register stages i.e. each multivibrator output controls the output for one associated shift register stage. Multivibrator 34 has outputs 34*a* and 34*b* which enable the associated coincidence gates 44*a* through 44*h* at the outputs of shift register stage 44. Multivibrator 36 similarly controls the outputs of shift register stage 46 through its associated coincidence gates 46*a* through 46*h*. Multivibrator 37 through its outputs 37*a* and 37*b* control the outputs of shift register stage 47 through its associated coincidence gates 47*a* through 47*h*, and multivibrator 38 controls through its outputs 38*a* and 38*b* the outputs of shift register stage 48 through its associated coincidence gates 48*a* through 48*h*.

Assume that shift register stage 47 has a set input or is at the one state and shift register stages 46, 48 and 44 are all at the 0 state. Further assume that an input clock pulse at terminal 11 will then enable all coincidence gates 14, 16, 17 and 18 together with coincidence gates 24, 26, 27 and 28 to yield an iutput providing there is an information pulse present at the other input of these gates. Thus, if stage 47 has a one therein, coincidence gate 17 will yield a one at its output and at this point and multivibrator 36 will be triggered to its opposite state. The other coincidence gates 14, 16 and 18 will all yield zeros since there will be no information pulse at their inputs and thus the first number read out will be a 0 from gates 24, 27 and 28 will not yield an output to their respective multivibrators since there will be no information pulse at their inputs. In this state multivibrators 34, 37 and 38 will have an enabling signal at outputs 34*b*, 37*b* and 38*b* respectively. Upon receipt of a circulating or a shift pulse at this point stages 44, 47 and 48 of the shift register will then pass their signal to the next stage of the shift register through coincidence gates 44*d*, 44*e*, 47*d*, 47*e*, and 48*d* and 48*e*. The output of shift register 46, however, cannot be passed through 46*d* and 46*e* since an enabling pulse is not present on output line 36*b* from multivibrator 36. Instead an enabling output is present at 36*a* which passes the outputs of shift register stage 46 through gates 46*b* and 46*g* to the inputs of gates 47*b*, 47*c* and 47*f* and 47*h*, bypassing stage 47. Hence, upon the next random-width pulse from pulse generator 13 and consequently the next series of shift pulses from shift pulse generator 15, stage 47 will be bypassed and the one, previously in stage 47, will be circulated through stages 48, 44 and 46. At this time also counter 12 has made a 1 count and on the next clock pulse at terminal 11 will register a 2 count. After all of the possible locations of the circulating 1 are used up, every multivibrator 34, 36, 37 and 38 will be in the condition described with respect to multivibrator 36 i.e. the enabling pulse will be from the (*a*) terminal and at that time counter 12 will have counted the number of stages in the circulating shift register. Gate 20 is at that time receiving an enabling pulse at all of its inputs resulting in a reset pulse at the output thereof which is coupled to multivibrators 34, 36, 37 and 38 resetting all the multivibrators to their original condition i.e. with an enabling output at their (*b*) terminals 34*b*, 36*b*, 37*b*, and 38*b*. This results in an enabling pulse being coupled to coincidence gates 46*d*, 46*e*, 47*d*, 47*e*, 48*d*, 48*e*, 44*d* and 44*e*. Each stage is then coupled through its respective coincidence gates to the following stage to start the permutation cycle over again with the next clock pulse at input terminal 11.

Obviously many modifications and variations of the present invention are possible in the light of the above teachings. Any desired number of shift register stages can be utilized, for example, together with the associated circuitry, as dictated by the number of conditions in a given set. It is therefore to be understood that within the scope of the appended claims the invention may be practiced otherwise than as specifically described.

What is claimed is:

1. A random permutation generator comprising:

an input terminal;

means connected to said input terminal for generating a random number of shift pulses, circulating storage means having a serial storage stages, each of said stages connected to said shift pulse generating means, said storage means operable to shift stored information one stage upon receiving a shift pulse, a plurality of bypass means, each of said serial storage stages having an output connected to a different one of said bypass means, all of said bypass means connected to said input terminal, each of said bypass means operable to bypass the stages following the stage connected thereto upon coincidence of an output from said storage stage and a clock pulse, a plurality of read-out means each of said read-out means connected to said input terminal and an output of a different one of said stages, each of said read-out means operable to yield a signal at its output upon the coincidence of an output from said storage and a clock pulse, 2. A random permutation generator comprising:

an input terminal adapted for connection to clock pulse means, a random width pulse generating means having an input connected to said input terminal, said random width pulse generating means operable to produce a pulse of random width in response to an input pulse, shift pulse generating means having an input connected to said variable width pulse generating means, said shift pulse generating means operable to produce shift pulses during the period of said random-width pulse, circulating storage means having a serial storage stages, each of said stages connected to said shift pulse generating means, said storage means operable to shift stored information one stage upon receiving a shift pulse, a plurality of bypass means, each of said serial storage stages having an output connected to a different one of said bypass means, all of said bypass means connected to said input terminal, each of said bypass means operable to bypass the stages following the stage connected thereto upon coincidence of an output from said storage stage and a clock pulse, a plurality of read-out means each of said read-out means connected to said input terminal and an output of a different one of said stages, each of said read-out means operable to yield a signal at its output upon the coincidence of an output from said storage and a clock pulse, 3. A random permutation generator comprising;

an input terminal adapted for connection to clock pulse means, a random width pulse generating means having an input connected to said input terminal, said random width pulse generating means operable to produce a pulse of random width in response to an input pulse, shift pulse generating means having an input connected to said variable width pulse generating means, said shift pulse generating means operable to produce shift pulses during the period of said random-width pulse, circulating storage means having $n$ serial storage stages, each of said stages connected to said shift pulse generating means, said storage means operable to shift stored information one stage upon receiving a shift pulse, a plurality of bypass means, each of said serial storage stages having an output connected to a different one of said bypass means, all of said bypass means connected to said input terminal, each of said bypass means operable to bypass the stages following the stage connected thereto upon coincidence of an output from said storage stage and a clock pulse, a plurality of read-out means each of said readout means connected to said input terminal and an output of a different one of said stages, each of said read-out means operable to yield a signal at its output upon the coincidence of an output from said storage and a clock pulse, reset means having an input connected to said input terminal and an output connected to each of said bypass means, said reset means operable to reset all of said bypass means upon receiving clock pulses.

4. The random permutation generator of claim 3 wherein each of said bypass means comprises a bistable multivibrator connected to one input of an AND gate, another input of said AND gate connected to an output of one of said storage stages, and an output of said AND gate connected to the storage stage following said one of said storage stages.

5. The random permutation generator of claim 2 wherein each of said bypass means comprises a bistable multivibrator connected to one input of an AND gate, another input of said AND gate connected to an output of one of said storage stages, and an output of said AND gate connected to the storage stage following said one of said storage stages.

6. The random permutation generator of claim 1 wherein each of said bypass means comprises a bistable multivibrator connected to one input of an AND gate, another input of said AND gate connected to an output of one of said storage stages, and an output of said AND gate connected to the storage stage following said one of said storage stages.

References Cited by the Examiner

UNITED STATES PATENTS

| | | | |
|---|---|---|---|
| 2,767,315 | 10/59 | Kosten | 311—78 |
| 3,049,676 | 8/61 | Zinke | 331—78 |
| 3,124,753 | 3/64 | Gieseler | 331—78 X |

ARTHUR GAUSS, *Primary Examiner.*